United States Patent
O'Brien

(10) Patent No.: US 7,358,893 B2
(45) Date of Patent: Apr. 15, 2008

(54) PSEUDO RANDOM CODE MODULATED SIGNAL COMBINER

(75) Inventor: Colin O'Brien, Calgary (CA)

(73) Assignee: NovAtel, Inc., Calgary, Alberta (CA)

( * ) Notice: Subject to any disclaimer, the term of this patent is extended or adjusted under 35 U.S.C. 154(b) by 0 days.

(21) Appl. No.: 11/517,716

(22) Filed: Sep. 8, 2006

(65) Prior Publication Data

US 2008/0062042 A1 Mar. 13, 2008

(51) Int. Cl.
*G01S 1/02* (2006.01)
(52) U.S. Cl. .................................. 342/357.06
(58) Field of Classification Search ........... 342/357.06, 342/357.12, 372, 375; 701/213, 215
See application file for complete search history.

(56) References Cited

U.S. PATENT DOCUMENTS

| | | | |
|---|---|---|---|
| 5,101,416 A | 3/1992 | Fenton et al. | |
| 5,107,273 A * | 4/1992 | Roberts | 342/417 |
| 5,323,322 A * | 6/1994 | Mueller et al. | 701/215 |
| 5,926,470 A * | 7/1999 | Tiedemann, Jr. | 370/334 |
| 6,678,589 B2 | 1/2004 | Robertson et al. | |
| 6,724,811 B2 | 4/2004 | Kohli et al. | |
| 6,844,847 B2 | 1/2005 | Gounon | |
| 2005/0100077 A1* | 5/2005 | Rosen et al. | 375/130 |
| 2007/0047678 A1* | 3/2007 | Sibecas et al. | 375/343 |

* cited by examiner

*Primary Examiner*—Dao Phan
(74) *Attorney, Agent, or Firm*—Cesari and McKenna, LLP

(57) ABSTRACT

A circuit and associated method for determining the heading of a vehicle or device with a satellite ranging system receiver is provided. The circuit requires only a single front end RF stage. A single RF stage can be used because the incoming signal received at the first antenna is delayed with respect to the signal received at the second antenna and the two signals are merged together, to form a combined signal. The combined signal can be down converted and sampled in a single stage. The samples are then separately correlated to detect the data associated with the portion of the signal attributed to each antenna. The differences between the measured data are then used to calculate the relative orientation (heading and pitch) of the device upon which the two antennas are disposed.

17 Claims, 5 Drawing Sheets

PSEUDO RANDOM CODE MODULATED SIGNAL COMBINER

BACKGROUND OF THE INVENTION

1. Field of the Invention

This invention relates generally to digital receivers for use with pseudo random noise (PRN) encoded signals such as those used in satellite ranging systems.

2. Background Information

There are a number of satellite ranging systems that are currently deployed and additional systems are to be deployed in the near future. Each of these configurations is based upon transmission of ranging signals in particular frequency bands. More specifically, the present United States Global Positioning System (GPS) is based on transmission of ranging signals in two frequency bands known as L1, which is at a center frequency of 1575.42 MHz and L2, centered at 1227.6 MHz. To enhance the reliability and availability of this system, additional GPS signal structures are planned (e.g. L5, L2C). In addition, other satellite ranging systems are being deployed or have been deployed such as that of the Russian Federation, i.e., GLONASS (with two signal structures: G1 and G2), and the European GAL-LILEO system with multiple signal structures (referred to herein as: E1, E2 . . . E5, etc.)

The system satellites transmit precisely timed signals that contain a number of components, namely, a plurality of pseudo-random noise (PRN) codes and data. The signals allow for precise determination of latitude, longitude, elevation and time. A digital receiver operating in a known manner, receives the PRN-encoded signals and essentially synchronizes local versions of the transmitted codes to the received codes, that is, the receiver tracks the received codes, to determine time differences of arrival and Doppler measurements. The digital data, which consists of information such as the satellite ephemeris, (i.e. position, current time of day, and system status information), is also transmitted by each satellite on at least one carrier frequency as a low frequency (typically 50 Hertz) signal. After synchronization of the local PRN codes, and their carriers, the receiver obtains the data. The receiver then uses the information provided by the data and the times of arrival and so forth to produce pseudoranges for the respective satellites in view and to determine its global position using the pseudoranges.

As noted, a satellite ranging signal receiver receives a composite signal consisting of one or more of the signals transmitted by the satellite within view (within a direct line of sight) as well as noise and interfering signals. By determining the transmission time from at least four satellites and knowing each satellite's ephemeris, the receiver can calculate the pseudoranges and thus its three-dimensional position, its velocity and the precise time of day.

When calculating heading information of a mobile device, such as a boat, aircraft or other vehicle, several receivers and corresponding antennas are located on the vehicle, spaced apart from one another. The antennas receive signals from the same set of satellites and determine their global positions as described above. Once the position of each antenna is known, the position information can be used to calculate a precise directional heading of the boat or other vehicle upon which the antennas are mounted. Alternately and preferably interferometric differences in the measured phase data can be used to determine attitude and relative orientation of antennas, as is well know in the art. However, a separate receiver has typically been required for each antenna being used to make such a heading calculation, thus leading to a costly system for receiving and analyzing inputs from each of the antennas used to provide the requisite information.

In U.S. Pat. No. 6,844,847 entitled BOAT POSITIONING AND ANCHORING IN A SYSTEM, of Gounon, which issued on Jan. 18, 2005, a receiver is described that includes a multiplexer which multiplexes the signals from two separate antennas together such that the receiver can separately utilize the signals from each antenna to track the respective PRN codes and determine the global positions of the antennas. However, this receiver tracks the codes in the signals provided by a given antenna only half of the time and thus, the tracking operations are susceptible to loss of phase lock. If phase lock is lost, the receiver must re-align the local codes in order to determine the antenna positions reliably, and the results of the heading calculations are therefore delayed or may be interrupted entirely.

There remains a need, therefore, for a receiver which, inter alia, receives and simultaneously processes signals from more than one antenna and uses information from each respective antenna to calculate the heading of an associated vehicle. There remains a further need for a receiver architecture which is of a reduced size and cost, and which accommodates multiple antenna signals at a nominal increase in receiver complexity.

SUMMARY OF THE INVENTION

The disadvantages of prior techniques are overcome by the present invention, which provides a pseudo random code modulated signal combiner and receiver assembly for use with a satellite ranging system receiver that receives signals using at least two antennas. The receiver, which simultaneously processes the signals from all of the antennas, utilizes a single front end RF downconversion stage and multiple channels. Accordingly, the architecture is less complex than utilizing two receivers. The assembly is used for determining the directional heading of a vehicle, boat, aircraft, or other device.

In accordance with an illustrative embodiment of the invention in which the signal combiner and receiver assembly are deployed on a boat, for example, a first antenna is mounted on the bow of the boat and a second antenna is mounted on the stern of the boat. A GPS receiver located on the boat receives signals from the same set of satellites at the first antenna and the second antenna. In accordance with the invention, the signal received at the first antenna (referred to hereinafter as the "first signal") is subjected to a fixed delay. More specifically, the pseudo random code modulated first signal is delayed with respect to the pseudo random code modulated signal at the second antenna (the "second signal.") This delay allows, in accordance with the invention, the second signal to be merged with the delayed first signal to form a single, combined signal. The first signal is sufficiently delayed to allow two separate correlation peaks to occur in signal processing. In an illustrative embodiment of the invention, this delay may be 1 to 2 code chips, for example. The combined signal then is down converted to an intermediate frequency signal thus requiring only a single RF down conversion stage. In other words, there is no need for separate RF down conversion stages for the first and second signals, respectively.

In accordance with one aspect of the invention, the combined signal is then digitized and is used as an input to two correlation channels per satellite code. The first correlation channel includes a PRN code generator, which produces a locally generated code which is correlated with the combined signal to track the PRN code in the first signal. The first channel thus produces correlation measurements from which the position of the first antenna can be determined. The second correlation channel includes a second PRN code generator and a second set of correlators. The second channel is programmed to use the information from the portion of the combined signal representing the second signal, and thus, to ignore the code from the first antenna. When the correlation peak with respect to the second signal is located, the associated correlation measurements are used to determine the position of the second antenna.

The distance between the two antennas is known, and once the position of each antenna is determined, the directional heading of the boat can be determined with reference to magnetic north or another directional reference point.

Interferometric processing of the measured pseudorange and/or carrier phase data can also be used to determine the relative orientation of the two (or more) antennas.

In an alternative embodiment of the invention, the satellite ranging system receiver signal processing electronics can be designed such that only one PRN code generator per satellite code is required. The code produced by the single PRN code generator is supplied to a first set of correlators after passing through a delay element that applies an adjusted delay to the local code, to account for the fixed delay which was introduced into the first signal and also to account for the differences in the times of arrival of the code to the first and second antennas. The correlation measurements produced by the first set of correlators is then used to calculate the position of the first antenna. The PRN code generator also passes the local PRN code to a second set of correlators, which compares the local code with the code from the second antenna and produces correlation measurements that are used to determine the position of the second antenna, and also to control the code phase of the PRN code generator. The position information corresponding to each of the antennas is then used to calculate the heading as discussed. The signal processing portion of the receiver can also be programmed to make other calculations with respect to the vehicle, such as ground track, and the like.

BRIEF DESCRIPTION OF THE DRAWINGS

The above and further advantages of the invention may be better understood by referring to the following description in conjunction with the accompanying drawings, in which.

DETAILED DESCRIPTION OF AN ILLUSTRATIVE EMBODIMENT

Figure 1:
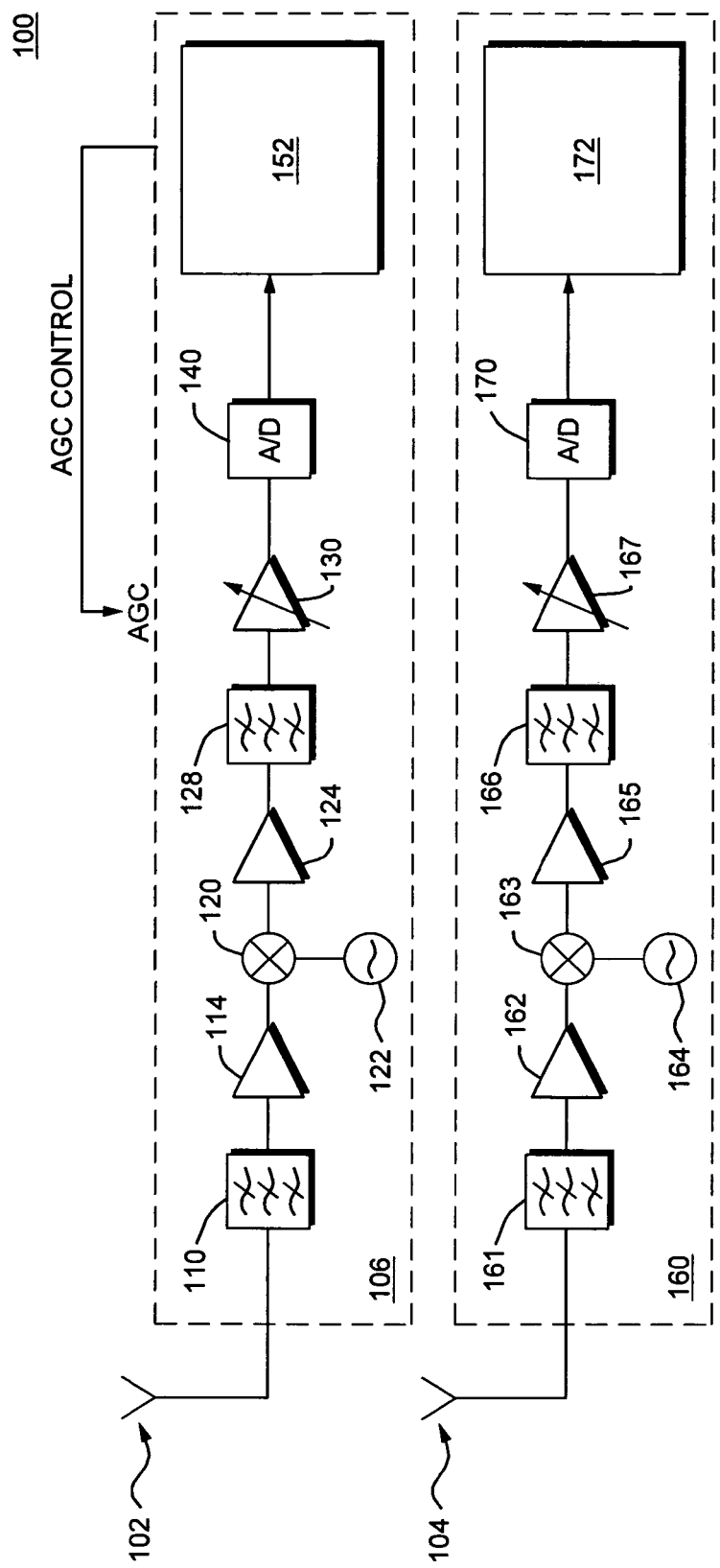
FIG. 1 is a block diagram of a prior art arrangement of two receivers used to determine heading.

FIG. 1 is a block diagram of a conventional arrangement 100 of GPS receivers that are used to determine heading. The arrangement 100 includes a first antenna 102 and a second antenna 104 which receive ranging signals from multiple satellites that are then in view (line of sight) of the receivers. With respect to the first antenna 102, a receiver (illustrated in dashed block 106) includes an RF band pass filter 110, which is a low insertion loss filter having a selected pass band centered at a desired carrier frequency. The band pass filter 110 should have a sufficiently wide range to allow several harmonics of the PRN codes to pass. The filtered signals then pass through a low noise amplifier 114.

Thereafter, downconversion is performed using a mixer 120 which downconverts the received signal from the carrier frequency to a desired intermediate frequency by mixing the received signal with a locally generated signal of an appropriate frequency that is produced by local oscillator 122. Appropriate amplification is then performed by the amplifier 124. An intermediate frequency band pass filter 128 is provided having a sufficiently narrow bandwidth to remove any undesired frequencies, but sufficiently wide to keep the desired frequency and one or more harmonics. The automatic gain control device 130 is used as a pre-amplification stage to adjust signal strength so that it is appropriate for sampling by the A/D converter 140. Digital samples obtained by the A/D converter 140 are passed to the signal processing circuitry 152, which acquires and tracks the satellite codes.

As shown in the prior art drawing, conventional systems require a separate receiver 160 for the signals from the second antenna 104. This separate receiver 160 requires its own set of the components as in receiver 106, namely a band pass filter 161, a low noise amplifier 162, a mixer 163 and an associated local oscillator 164, an amplifier 165 and an intermediate frequency filter 166, as well as an automatic gain control device 167. The second receiver 160 then feeds an analog signal to the A/D converter 170 to provide digital samples of the signal received from the second antenna 104 to the signal processing circuitry 172 for the second receiver. As is apparent from FIG. 1, there is thus duplication in the components in the receiver 100.

Figure 2:
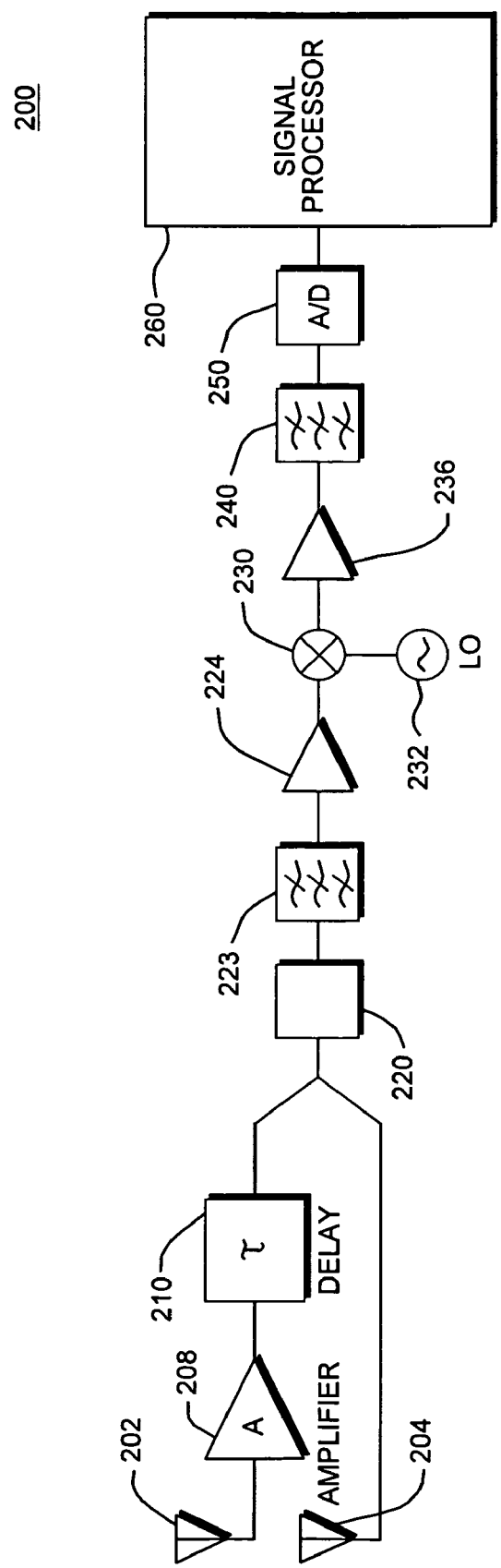
FIG. 2 is block diagram of a single receiver that determines heading including a signal combiner and GPS receiver assembly in accordance with the present invention.

A solution is provided by the device of the present invention, which is illustrated in FIG. 2. FIG. 2 depicts a signal combiner and GPS receiver assembly 200, which receives signals from two separate antennas 202 and 204. As noted, by way of illustrative example, antenna 202 is located, for example, on the bow of a ship and antenna 204 is located on the stern of the ship. Alternatively, the receiver 200 is readily adaptable such that the antennas may be located in two separate locations of an aircraft, or on another vehicle, such as a remotely controlled military vehicle or other device. The antennas 202 and 204 receive ranging signals from one or more satellites. For calculation of the heading of the vehicle upon which antennas 202 and 204 are deployed, the signal of interest is a signal from the same satellite such that the signals received at antennas 202 and 204 include the same PRN codes.

In accordance with an illustrative embodiment of the invention, the signal from the antenna 202 is amplified with amplifier 208, to accommodate the insertion loss of the delay element, and subjected to a fixed delay using the delay circuit 210. The amount of the delay is selected such that the signal from the first antenna 202 is delayed with respect to the signal from the second antenna 204 in such a manner that when the two signals are combined, two separate PRN code correlation peaks can be determined—one for each of the signals. As will be understood by those skilled in the art, the C/A PRN code in a GPS satellite ranging signal is 1023 bits long, and these bits are also known to those skilled in the art as "code chips," with each code chip representing a 1 or a 0. The rate at which the GPS signal is transmitted is such that a different code chip is transmitted every microsecond. In accordance with the present invention, the fixed delay is equivalent to at least one code chip such that cross correlation between the two codes is avoided. The signal combiner and receiver assembly of the present invention has been tested and deemed to be fully operational using a 1.75 code chip delay between the two signals.

The delayed first signal associated with the antenna 202 and the second signal received from the second antenna 204 are merged by a suitable signal combiner 220, to form a combined signal. The combined signal is introduced to an appropriate front end filter 223 to remove any noise which may have been introduced in the combining stage. The signal is then amplified appropriately using the low noise amplifier 224. A mixer 230, then downconverts the combined signal to a desired intermediate frequency (IF) by mixing the signal with a signal produced by a local oscillator 232. The IF combined signal is then amplified further using amplifier 236 and passed through a low noise filter 240.

The IF combined signal is next sampled and converted to digital values by the single A/D converter 250. The A/D converter 250 is regulated by an appropriate sampling clock (not shown). The digital counterparts of the combined analog signal which include portions from the delayed first signal associated with antenna 202 and the second signal from the antenna 204, are passed to the signal processing circuitry 260 as described further herein with reference to FIG. 3.

Figure 3:
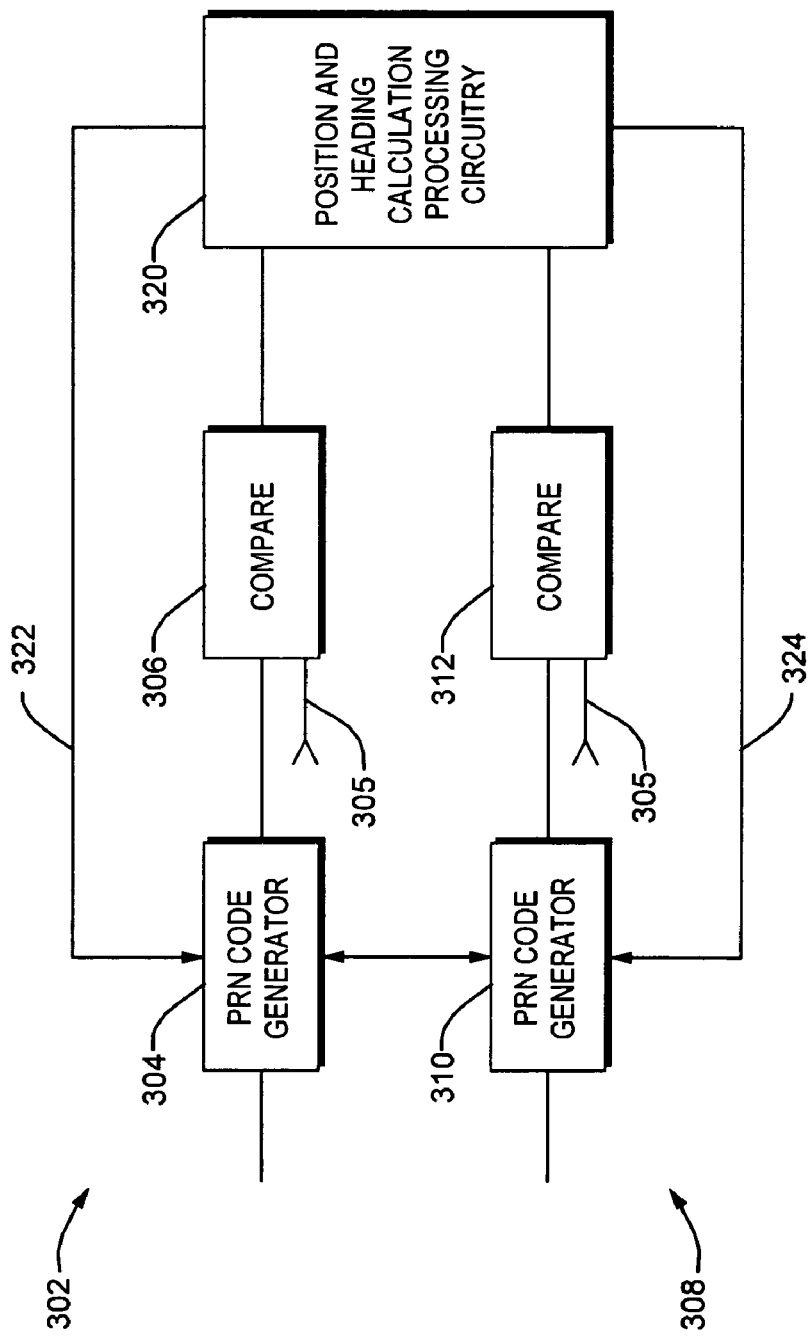
FIG. 3 is a schematic block diagram of one embodiment of the signal processing portion of the receiver of the present invention in which a separate PRN code generator is used for each antenna being monitored.

FIG. 3 illustrates one illustrative embodiment of the signal processing circuitry 260 (FIG. 2) in which there are two channels for processing the incoming signal from samples of the combined signal. More specifically, the first channel 302 includes a first PRN code generator 304 which generates a local PRN reference signal corresponding to the PRN code associated with the satellite from which the first and second signals have been received. A PRN code signal comparison circuit 306 receives as inputs the locally generated code from the PRN code generator 304 and the samples of the combined signal 305. The compare circuit 306 includes at least two correlators (not shown). In a first mode, the correlators can be used for acquiring the PRN code. In that mode, the first correlator is configured as an early correlator and the second correlator is configured as a late correlator. A second mode is used for PRN code tracking and in the second mode the first correlator is configured as an early minus late correlator and the other correlator is a punctual correlator. Alternatively, three correlators may be used. In either mode, the correlators operate in a conventional manner to produce correlation measurements which are used by position circuitry 320 in a conventional manner to acquire and track the received code and ultimately to determine the distance of the receiver from the satellite being tracked.

In addition, the position and heading calculation signal processing circuit 320 also generates a first feedback signal 322 to be used for phase synchronization of the first PRN code generator 304. Further details regarding the correlation process are provided in commonly owned U.S. Pat. No. 5,101,416, issued on Mar. 31, 1992, to Fenton, et al., which is incorporated by reference herein in its entirety.

In accordance with the present invention, a second channel, which includes a second PRN code generator 310 is programmed to search for a second PRN code in the incoming samples. The second channel thus operates the second PRN code generator to produce a local code that precedes or trails the code produced by the first PRN code generator by the length of the fixed delay. More specifically, when a correlation peak is determined in the first compare circuit 306, the associated code timing information is communicated to the second PRN code generator 310. The second compare circuit 312 then searches the code at one or more code chips away from the peak found with respect to the first antenna to locate a different correlation peak which is attributable to the signals from the second antenna. In this way, the portion of the combined signal, which is associated with the second antenna, 204 (FIG. 2) is identified. In a manner similar to compare circuit 306, the compare circuit 312 produces correlation measurements to the signal processing circuit 320, which produces a second feedback signal 324 for phase synchronization of the second PRN code generator 310, and also the position information.

Accordingly, the signals from the first antenna 202 are processed in the first channel 302, to obtain correlation measurements for the first antenna. The signals from the second antenna 204 are processed in the second channel 308 and are used to determine the correlation measurements with respect to the second antenna. The comparison circuits 306, 312, accumulate the respective correlation measurements and provide the measurements to the position and heading calculation signal processing circuit 320, which determines the respective positions of the two antennas and the precise heading of the vehicle on which the two antennas are mounted.

Figure 4:
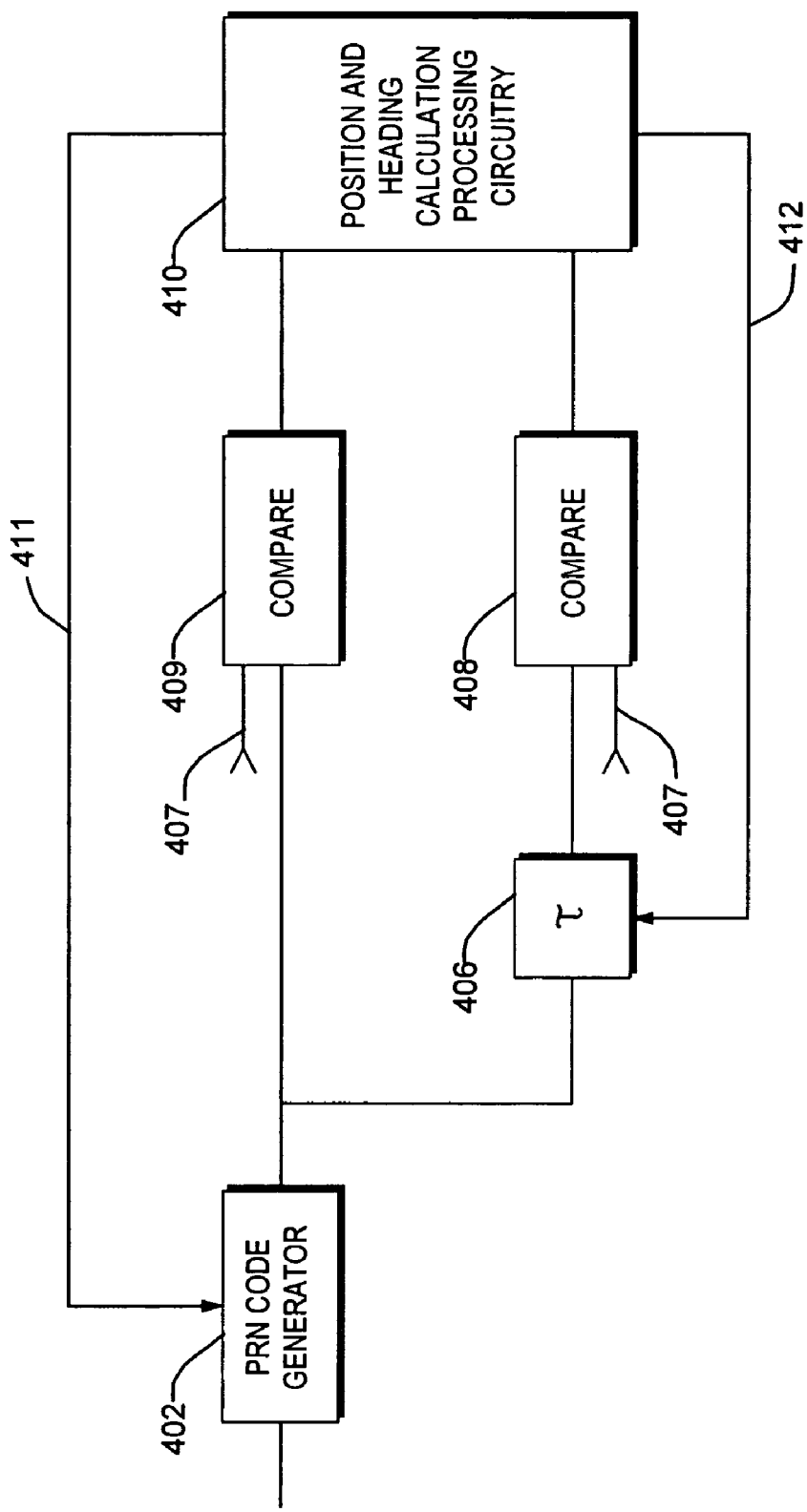
FIG. 4 is a schematic block diagram of the signal processing circuitry in accordance with another embodiment of the invention in which a single PRN code generator is employed in accordance an illustrative embodiment of the present invention.

In an alternative embodiment of the invention, which is illustrated in FIG. 4, a single PRN code generator 402 is used along with an adjustable delay 406 that incorporates the fixed delay introduced by the front end circuit of FIG. 2, and makes an appropriate adjustment to the delay to account for the fact that the signals arrive at the first antenna at a different time than the second antenna. A compare circuit 408 has as inputs, the locally generated code from the PRN code generator 402 and the samples from the combined signal 407. The compare circuit 408 compares the delayed PRN code signal with the samples of the combined signal to produce correlation measurements that are associated with the first antenna. The correlation measurements are used by the processing circuitry to control the adjustable delay. The combined signal samples are also sent to comparison circuit 409, with the combined signal 407 to produce correlation measurements that are associated with the second antenna. These correlation measurements are used by the processing circuitry to control the PRN code generator. When both the PRN code signal and the delayed PRN code signal are in synchronism with the corresponding antenna signals, the position and heading calculation signal processing circuit 410 determines the position of each antenna. From the position information thus obtained, the heading of the vehicle is determined. Interferometric processing can be used in making such determinations.

In another embodiment of the invention, the signal combiner and receiver assembly is used with a Local Area Augmentation Antenna ("IMLA"). The IMLA antenna assembly includes a first antenna, which is pointed directly upwardly, and a second antenna, which is oriented 90 degrees from the first antenna in an azimuth direction. In such a case, all of the satellite signals that are received can be combined together and used in a position solution. These results will include substantially high negative residuals and substantially high positive residuals. The high negative residuals can be attributed to one of the antennas, and the positive residuals are attributable to the other antenna. To the extent that all of the signals are from different satellites, the signals can be combined without introducing a delay into the signals from one of the antennas. However, in practice, there will typically be at least some overlap in signal reception between the two antennas, so a delay would illustratively be introduced into one of the received signals to allow the signals from each respective antenna to be separated and analyzed and a position calculation can then be performed.

In yet another embodiment of the invention, the signal combiner and receiver assembly is used on rotating bodies such as rockets and fighter aircraft where antennas are required on diametrically opposed sides of the structure to accommodate fuselage shading of the satellite signals.

Figure 5:
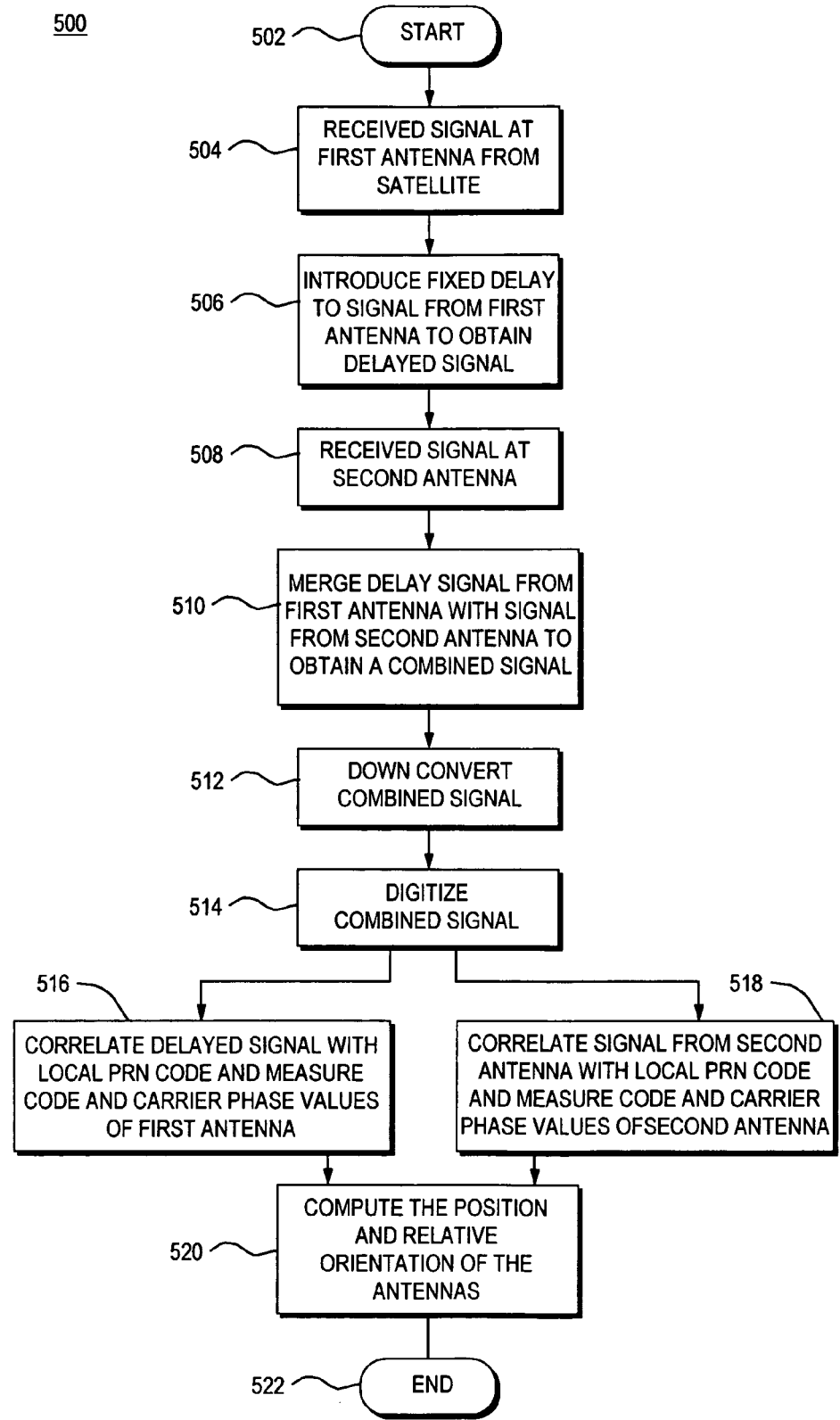
FIG. 5 is a flow chart of a procedure utilized to calculate the heading of a vehicle in accordance with the present invention.

The method of the present invention can be best understood with respect to the flow chart of FIG. 5, which illustrates a procedure 500. Procedure 500 begins at the start step 502 and continues to step 504 in which a signal is received at a first antenna from a satellite. In accordance with step 506, a fixed delay is introduced to that signal to obtain a delayed signal. The procedure 500 then continues to step 508 in which a signal is received at a second antenna, which is disposed on a vehicle at a predetermined distance from the first antenna.

In accordance with step 510, the delayed signal from the first antenna is merged with a signal from the second antenna to obtain a combined signal. In accordance with step 512 a combined signal is downconverted to an intermediate frequency. In accordance with step 514, the combined signal at the intermediate frequency is digitized to obtain samples of the combined signal. In step 516, the samples of the combined signal are fed to a comparison circuit in which the delayed portion of the combined signal is correlated with a first local PRN code to determine correlation measurements associated with the first antenna. Simultaneously, in accordance with step 518, the signal samples are correlated with a second local PRN code. In accordance with step 520, the position and relative orientation of the first antenna and the second antenna is determined, and using these positions, or the pseudorange and carrier phase measurements, the directional heading of the vehicle upon which the first antenna and the second antenna are disposed is calculated. The procedure ends at step 522.

It should be understood that the present invention provides a simplified front end signal combiner and satellite ranging system receiver assembly that eliminates the requirement of separate RF downconversion and signal processing channels downstream from a point where two signals are combined. Thus, the receiver has reduced complexity and requires less space on the circuit board. This simplification can also lead to cost savings.

The foregoing description has been limited to specific embodiments of the invention. It should be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A circuit for receiving signals from two or more antennas that are mounted on a vehicle, for use with a satellite ranging system receiver, the circuit comprising:

a first antenna configured to receive signals from a set of satellites;

a second antenna configured to receive signals from the same set of satellites as said first antenna;

a time delay circuit coupled to said first antenna having a predetermined time delay such that a fixed delay is introduced into a first signal received at said first antenna with respect to a second signal received at said second antenna; and a signal combiner configured to merge the delayed signal of the first antenna with the signal received by the second antenna to form a combined signal from which correlation measurements corresponding to the respective signals from the first and second antennas can be made for a given PRN code.

2. The circuit as defined in claim 1 further comprising a single RF stage circuit coupled to an output of said signal combiner configured to receive said combined signal, and configured to down convert said combined signal to an intermediate frequency;

a sampling circuit having an A/D converter configured to obtain digitized samples of said combined signal;

compare circuits configured to correlate the digitized samples with respective local versions of a PRN code corresponding to a satellite PRN code to produce correlation measurements; and a position and heading calculation processing circuit arrangement configured to receive the correlation measurements and to determine at least one of: a position of the first antenna and a position of the second antenna, and the relative orientation of the antennas.

3. The circuit as defined in claim 2 wherein:

the position and heading calculation processing circuit arrangement is further configured to calculate the heading of the vehicle upon which the antennas are mounted based on the position information.

4. The circuit as defined in claim 2 wherein said fixed delay is equivalent to more than 1 code chip.

5. The circuit as defined in claim 2 further comprising a first correlation channel including a first PRN code generator configured to produce a local PRN code which is correlated with the combined signal to track the PRN code of the first signal, and to obtain correlation measurements that are used to determine the position of the first antenna; and a second correlation channel including a second PRN code generator configured to produce a local version of a PRN code that precedes or trails the PRN code produced by said first PRN code generator by said fixed delay such that correlation measurements are obtained that correspond to the second signal and which are used to determine the position of the second antenna.

6. The circuit as defined in claim 2 further comprising a correlation channel including a single PRN code generator configured to produce a local version of the PRN code corresponding to the PRN code of a satellite from which the first and second signals are received;

a delay element which introduces an adjusted delay which accounts for said fixed delay introduced into the first signal and for the differences in the times of arrival of the code to the first and second antennas;

a first compare circuit coupled to receive the PRN code and to produce a first set of correlation measurements; and a second compare circuit coupled to receive the local code from the delayed PRN code from the delay element to obtain a second set of correlation measurements, whereby one or more of the range measurements and positions of the first antenna and the second antenna can be determined.

7. The circuit as defined in claim 1 wherein said circuit is deployed with respect to a rotating body.

8. A method of processing signals from two antennas located on a device using a satellite ranging system receiver, the method comprising the steps of:
disposing a first antenna in a first location on said device and disposing a second antenna on said device a given distance from the first antenna;
receiving at said first antenna, an incoming signal from a satellite;
selecting a predetermined amount by which to delay the incoming signal received at said first antenna, to produce a delayed signal;
receiving at said second antenna, an incoming signal from said satellite; and
combining the delayed signal with the signal received at the second antenna to produce a combined signal from which correlation measurements corresponding to the respective signals from the first and second antennas can be made for a given PRN code.

9. The method as defined in claim 8 wherein said predetermined delay is selected to be more than 1 code chip.

10. The method as defined in claim 8, comprising the further steps of:
downconverting the combined signal using a single RF stage including a local oscillator and a mixer to generate an intermediate frequency signal;
digitizing the intermediate frequency signal to obtain samples;
in a first channel, correlating the samples with a local version of the PRN code corresponding to the delayed PRN code from the first antenna to obtain data about the position of the first antenna;
in a second channel, correlating the samples with a local version of the PRN code corresponding to the PRN code from the second antenna to obtain pseudorange and carrier phase measurements from the second antenna; and
calculating the heading of the device using interferometric processing as is known in the art.

11. The method as defined in claim 8, comprising the further steps of:
downconverting the combined signal using a single RF stage including a local oscillator and a mixer to generate an intermediate frequency signal;
digitizing the intermediate frequency signal to obtain samples;
in a single channel, correlating the samples with a delayed local version of the PRN code corresponding to the PRN code from the satellite to obtain data about the position of the first antenna and correlating the samples with a local version of the PRN code corresponding to the PRN code from the satellite to obtain data about the position of the second antenna; and
calculating the heading of the device using interferometric processing between the first antenna and the second antenna.

12. The method as defined in claim 8 including the further step of providing said first antenna and said second antenna as antenna elements of a Local Area Augmentation Antenna.

13. The method as defined in claim 8 wherein said first and second antennas are disposed on a boat.

14. A system for processing signals from two antennas located on a device using a satellite ranging system receiver, comprising:
a first antenna disposed in a first location on said device and a second antenna disposed in a second position on said device a given distance from the first antenna;
means for receiving at said first antenna, an incoming signal from a satellite, and for selecting a predetermined amount by which to delay the incoming signal received at said first antenna, to produce a delayed signal and for receiving at said second antenna, an incoming signal from said satellite; and
means for merging the delayed signal with the signal received at the second antenna to produce a combined signal from which correlation measurements corresponding to the respective signals from the first and second antennas can be made for a given PRN code.

15. The system as defined in claim 14 wherein said predetermined delay is selected to be more than 1 code chip.

16. The system as defined in claim 14, further comprising:
means for downconverting the combined signal using a single RF stage including a local oscillator and a mixer to generate an intermediate frequency signal;
means for digitizing the intermediate frequency signal to obtain samples;
means, in a first channel, for correlating the samples with a local version of the PRN code corresponding to the delayed PRN code from the first antenna to obtain data about the position of the first antenna;
means, in a second channel, for correlating the samples with a local version of the PRN code corresponding to the PRN code from the second antenna to obtain data about the position of the second antenna; and
means for calculating the heading of the device using the position of the first antenna and the position of the second antenna.

17. The system as defined in claim 14, further comprising:
means for downconverting the combined signal using a single RF stage including a local oscillator and a mixer to generate an intermediate frequency signal;
means for digitizing the intermediate frequency signal to obtain samples;
means, in a single channel, for correlating the samples with a local version of the PRN code corresponding to the delayed PRN code from the first antenna to obtain data from the first antenna and further correlating the samples with a local version of the PRN code corresponding to the PRN code from the second antenna to obtain data from the second antenna; and
means for calculating the heading of the device using data of the first antenna and data of the second antenna.

* * * * *